UNITED STATES PATENT OFFICE.

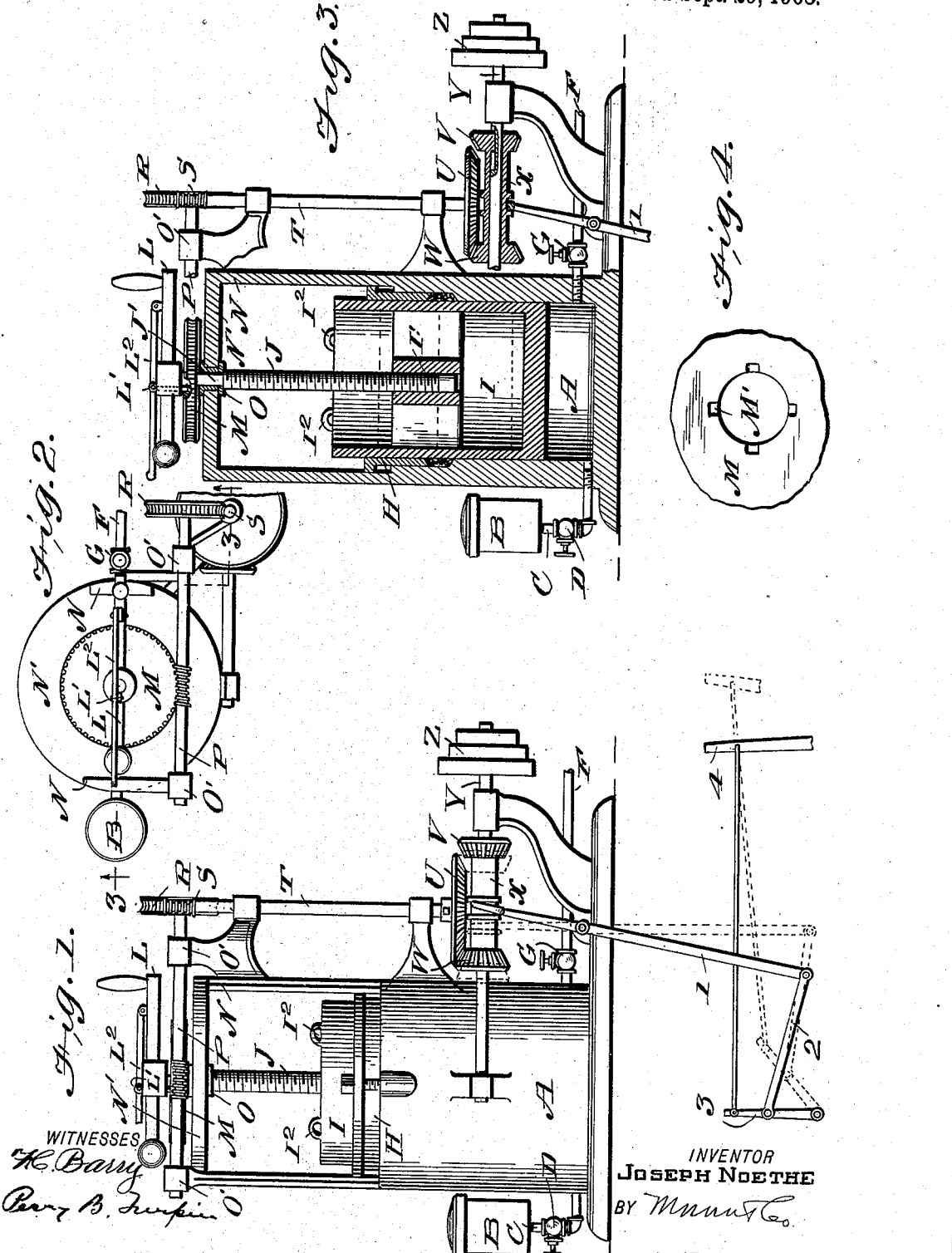

JOSEPH NOETHE, OF ELKTON, SOUTH DAKOTA.

LUBRICATOR.

No. 899,892.  Specification of Letters Patent.  Patented Sept. 29, 1908.

Application filed July 22, 1907. Serial No. 384,972.

*To all whom it may concern:*

Be it known that I, JOSEPH NOETHE, a citizen of the United States, and a resident of Elkton, in the county of Brookings and State of South Dakota, have invented certain new and useful Improvements in Lubricators, of which the following is a specification.

My invention is an improvement in lubricators, and particularly in force feed lubricators, and the invention consists in certain novel constructions and combinations of parts as will be hereinafter described and claimed.

In the drawing Figure 1 is a side elevation of a lubricator embodying my invention, and Fig. 2 is a top plan view thereof illustrating the construction at the upper end of the lubricator. Fig. 3 is a vertical longitudinal section of the apparatus, and Fig. 4 is a detail view of a fragment of the worm wheel.

My invention relates particularly to force feed lubricators for use on engines requiring lubrication, and is so constructed that when the engine is started a pressure is placed on the oil or in the oil reservoir and the oil is mechanically forced through a suitable pipe or conduit into the steam chest or other portion of the engine requiring lubrication.

In the construction shown the oil reservoir A is open at the top and has connection near its lower end with an oil cup B through a pipe C having a valve D, and an oil feed pipe F leads from the lower portion of the reservoir A to the engine, and is provided with a valve G, as best shown in Fig. 1 of the drawing.

The open upper end of the reservoir A has a stuffing-box H in which operates a piston I, which piston when forced downwardly into the reservoir operates to force the lubricant out of the pipe F when the valve G thereof is open, as will be understood by those skilled in the art.

Means are provided for forcing the piston downward including a threaded shaft J which screws in a threaded bearing at I' in the piston, the lower end of the shaft being inserted so that it can not operate to force the piston after the latter has been lowered to its lowermost position and the piston is provided at I² with handles by which it may be lifted to the threaded shaft J when there is no pressure in the cylinder A to force the piston upwardly. Near its upper end the threaded shaft J has an angular portion at J' fitting in a collar O journaled in a cross-bar N' at the upper ends of the uprights N. The collar O is shouldered above and below the cross-bar N' and above said collar O a worm wheel M is loose on the screw shaft J and may be keyed thereto by the pin L' on the pivoted bar L² mounted on the lever L, the said lever L being fast to the screw-shaft J at the upper end of the latter. The worm wheel M has a series of notches M' forming seats for the pin L' when the latter is engaged with the worm wheel to key the same on the screw-shaft. It will be understood that this is useful in operating the screw-shaft to raise the piston which may be effected by the lever L by simply adjusting the pivot bar L² to free the worm wheel from the screw-shaft so the piston I may be raised without necessitating the operation of the gearing presently described.

The framing is provided with bearings O' for a transverse worm shaft P which meshes with the worm wheel M. The worm shaft P has a worm wheel R which is meshed by a worm S on an upright shaft T, which shaft T is provided at its lower end with a bevel gear U which is meshed by one or the other of bevel pinions V and W connected by a sleeve X keyed to and slidable along a drive shaft Y which latter is provided with band pulleys Z by which it may be geared with the engine to be driven thereby in the operation of the invention. The pinions V and W provide for operating the piston downwardly whether the engine be driven in one direction or the other, as if the shaft Y be turned in one direction and the pinion V be meshed with the bevel gear U it will turn the upright shaft in the same direction as if the pinion W were meshed with the gear U and the direction of the shaft Y reversed, as the result of reversing the engine. The reversing mechanism includes a lever 1 for sliding the sleeve X, a pitman 2 for operating the lever 1, and a hand lever 3 by which the connecting lever 1 may be operated. It is preferred to connect the lever 3 by any suitable mechanism with the reversing device 4 of the engine so that when the engine is reversed, the lever 3 will be operated to shift the gearing V and W in order to set one or the other of the pinions V or W into engagement with the bevel gear U according to the direction in which the engine is operated. The reversing device is shown as a lever 4, and as the reversing levers differ in different cases in engines, it will be understood that I simply show the lever 4 as an illustration of the manner of connection.

It will be noticed that the gearing is such that there is a great reduction of speed in the means for operating the screw-shaft of the piston so the same can be operated at as slow speed as desired.

When the reservoir has been emptied in the operation of the invention, the valve in the discharge pipe may be closed, and the valve in the feed cup opened and oil poured into the feed cup so that when the piston is raised creating a vacuum below it the oil will be drawn from the oil cup into the reservoir which latter may be made of any suitable size, as desired. When the piston is raised, the valve in the oil cup connection may be closed and the valve in the discharge pipe opened and the operation proceed as before.

What I claim is—

1. A force feed lubricator comprising a reservoir open at one end, a stuffing box at such end, a piston operating through the stuffing box, a screw-shaft threaded in said piston, a worm wheel on the shaft, framing projecting from the reservoir and supporting said worm wheel, a transverse shaft having a worm meshing with the worm wheel of the disk, said shaft being also provided with a worm wheel, an upright shaft having a worm meshing with the worm wheel of the transverse shaft and provided also with a bevel gear, a drive shaft, a sleeve keyed and slidable thereon and having pinions on opposite sides of the bevel gear and movable into and out of mesh therewith, means for shifting said sleeve, an engine reversing device, means connecting the reversing device with the means for shifting the sleeve, and means for driving the drive shaft, substantially as set forth.

2. The combination with a reservoir, an oil cup having a valved connection therewith, a piston operating in the reservoir, and a screw-shaft for operating the piston, of a worm wheel for turning the screw shaft, a transverse shaft having a worm meshing with said worm wheel, the said shaft being also provided with a worm wheel, a shaft having a worm meshing with the worm wheel of the transverse shaft and also provided with a bevel gear, a drive shaft and bevel pinions thereon movable into and out of mesh with the bevel gear, substantially as set forth.

3. A lubricator comprising a reservoir, a piston operating therein, a drive shaft having bevel pinions, a connecting shaft having a bevel gear in position to be meshed by the pinions of the drive shaft, intermediate mechanism whereby the connecting shaft may operate the piston, a feed pipe connected with the reservoir and a pipe leading therefrom, substantially as set forth.

4. The combination in a force feed lubricator with the reservoir and the piston operating therein, of a threaded shaft for operating the piston, a worm wheel loose on the shaft, gearing whereby to turn said worm wheel, a lever fixed to the screw shaft whereby it may be operated to turn the same for releasing the piston, and devices carried by the lever for connection with the worm wheel whereby to key the lever to the screw shaft, substantially as set forth.

JOSEPH NOETHE.

Witnesses:
FRED W. CUCKOW,
R. O. GREEN.